United States Patent [19]

Crowell

[11] 4,442,897

[45] Apr. 17, 1984

[54] FORMATION FRACTURING METHOD

[75] Inventor: Ronald F. Crowell, Jenks, Okla.

[73] Assignee: Standard Oil Company, Chicago, Ill.

[21] Appl. No.: 377,657

[22] Filed: May 13, 1982

Related U.S. Application Data

[63] Continuation of Ser. No. 152,938, May 23, 1980, abandoned.

[51] Int. Cl.³ .......................................... E21B 43/267
[52] U.S. Cl. ................................. 166/280; 166/308
[58] Field of Search ............... 166/280, 281, 259, 271, 166/283, 308

[56] References Cited

U.S. PATENT DOCUMENTS

| | | | |
|---|---|---|---|
| 3,121,464 | 2/1964 | Huitt et al. | 166/281 X |
| 3,172,471 | 3/1965 | Warren | 166/281 |
| 3,592,266 | 7/1971 | Tinsley | 166/308 X |
| 3,710,865 | 1/1973 | Kiel | 166/308 |
| 3,888,312 | 6/1975 | Tiner et al. | 166/308 |
| 3,977,472 | 8/1976 | Graham et al. | 166/308 X |
| 4,109,721 | 8/1978 | Slusser | 166/280 |
| 4,156,464 | 5/1979 | Hussin | 166/308 |

Primary Examiner—George A. Suchfield
Attorney, Agent, or Firm—Scott H. Brown; Fred E. Hook

[57] ABSTRACT

A method is disclosed for fracturing a subterranean formation penetrated by a wellbore, the fracturing being accomplished by first injecting into said formation a low leakoff, high efficiency fluid followed by a controlled viscosity fluid carrying propping agents.

4 Claims, 5 Drawing Figures

FORMATION FRACTURING METHOD

This is a continuation of application Ser. No. 152,938, filed May 23, 1980, (now abandoned).

BACKGROUND OF THE INVENTION

1. Field of the Invention

The present invention relates generally to methods of fracturing formations in wells and, more particularly, to methods of hydraulically fracturing and propping a formation after the formation is initially fractured.

2. Setting of the Invention

Oil and gas accumulations usually occur in porous and permeable underground rock formations. In order to produce the oil and gas contained in a formation, a well is drilled into the formation. The oil and gas may be contained in the porosity or pore spaces of the formation, the pore spaces being hydraulically connected by means of permeability or interconnecting channels between the pore spaces. After the well is drilled into the formation, oil and gas are displaced to the wellbore by means of fluid expansion, natural or artificial fluid displacement, gravity drainage, capillary expulsion, etc. These various processes may work together or independently to draw out the hydrocarbons into the wellbore through existing flow channels. In many instances, however, production of the well may be impaired by drilling fluids that enter into and plug the flow channels, or by insufficient natural channels leading into the particular borehole. Either case may result in a noncommercial well caused by the low permeability. The problem then becomes one of treating the formation in a manner which will increase the ability of a formation rock to conduct fluid into the well.

Hydraulic fracturing is a widely used well stimulation technique designed to increase the productivity of a well by creating fractures in the formation surrounding the well. The technique normally involves two basic steps: (1) injecting a fluid into the formation at a rate and pressure sufficient to propagate a fracture adjacent the well and (2) placing propping agent particles in the fracture to maintain it in a propped condition when the applied pressure is relieved. During the propagation step of the treatment, the fracturing fluid must have properties which provide the proper wedging effect for creating a fracture of the desired geometry. These properties relate to the fluid loss characteristic and the viscosity of the fluid employed as the fracturing medium.

It has long been known that the fluid efficiency of a fracturing fluid must be high if fractures of reasonable lengths and widths are to be obtained. Fluid efficiency, as used in fracturing operations, is defined as the percent of injected fluid which remains within the fracture and is a measure of the fluid loss characteristic of the fluid. Many fluids tend to leak off rapidly into the formation matrix and therefore provide low fluid efficiencies. The fluid efficiency can be improved by the addition of fluid loss control additives, which are generally finely divided inert materials such as silica flour, talc, calcium carbonate, and the like.

In the design of a fracturing fluid, the effect of the fluid on pumping requirements must be considered. The wedging effect described above must be achieved without excessive friction loss in the well conduit leading to the formation. High friction losses limit the available power deliverable to the formation, increase the power requirements of injection facilities, and can generate pressures which approach the pressure limits of the wellbore tubing.

During the proppant placement phase of the treatment, the fracturing fluid acts as a carrier for the propping agent particles. The fluid must thus be capable of suspending large concentrations of particles for long transport distances.

Finally, the fracturing fluid should not damage the formation. This generally means that the fluid at formation conditions must possess sufficient mobility in the formation matrix and the propped fracture to be producible into the well along with formation fluids. This operation is referred to as well clean-up. Such fluid loss additives as silica flour, talc, calcium carbonate causes clogging of the fracture.

The characteristics of an ideal fracturing fluid, then can be summarized as follows: low friction loss in the well conduit; low fluid loss in the fracture during fracturing; controllable friction loss in the fracture; good proppant suspension capabilities; and high fluid loss in the fracture upon shut-in.

3. Publications

U.S. Pat. No. 4,109,721, Marion L. Slusser, issued on Aug. 29, 1978, and entitled "Method of Proppant Placement in Hydraulic Fracturing Treatment" is a relevant publication. In this patent, a method is disclosed for refracturing wells which have previously been fractured and a proppant pack deposited therein, a slug of liquid containing a sealant, normally fluid loss additives and desirably also a viscosifier, is injected via the well and into the formation to deposit the sealant or fluid loss additives along the upper surface of the previously deposited proppant pack and form a seal overlying this proppant pack. After sealing the upper surface of the previously deposited proppant pack, the well is refractured by injecting a high fluid loss fracturing fluid containing proppants suspended therein via the well into the formation to extend the fracture further in the formation to extend the fracture further in the formation and prop the extended portion thereof.

U.S. Pat. No. 3,710,865, Othar M. Kiel, issued on Jan. 16, 1973 and entitled "Method of Fracturing Subterranean Formations Using Oil in Water Emulsions" is also a relevant publication. In the Kiel patent, a fracturing method using an emulsion fracturing fluid is made up of a hydrocarbon phase and a gelled water phase. The viscosity of the emulsion at 70° F. was preferred to be 100 centipoises.

The present invention provides a method for fracturing a formation during which there is leakoff control of the fracturing fluid, i.e., a very low fluid loss coefficient and efficient proppant transportability. Overall, this method results in an improved efficiency of fracture treatment by creating more propped fracture area for less injected fluid volume.

SUMMARY OF THE INVENTION

The present invention relates to a method of fracturing a subsurface formation surrounding a wellbore comprising steps of injecting a quantity of fluid into the wellbore at a pressure sufficient to form a fracture in the formation, injecting a quantity of low leakoff, wall building fluid into said fracture in absence of a propping agent at a pressure equal to or greater than said fracture pressure, injecting a quantity of controlled viscosity fluid containing a propping agent into said fracture at a pressure equal to or greater than said fracture pressure, so that said fracture is lengthened and shutting in the wellbore.

DESCRIPTION OF THE PREFERRED EMBODIMENTS

Figure 1:
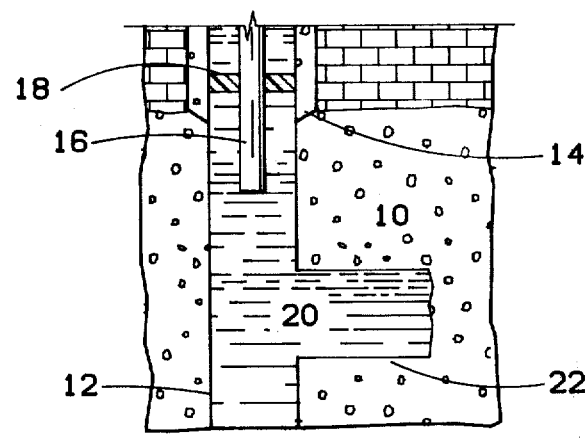
FIG. 1 is a view of the formation in a well after it has been initially fractured.

Referring now to the drawings, FIG. 1 shows formation 10 in which a wellbore 12 has been drilled. A casing 14 and a string of tubing 16 is disposed within the wellbore 12. A packer 18 is set between the tubing 16 and the casing 14 to prevent fluids from entering the annulus between casing 14 and the tubing 16. Formation 10 is initially fractured by applying pressure on its exposed surfaces with the fracturing fluid 20 until failure results. Upon failure, a fracture 22 is formed in the formation 10. Any conventional breakdown fluid may be used for accomplishing initial fracture of the formation 10.

Figure 2:
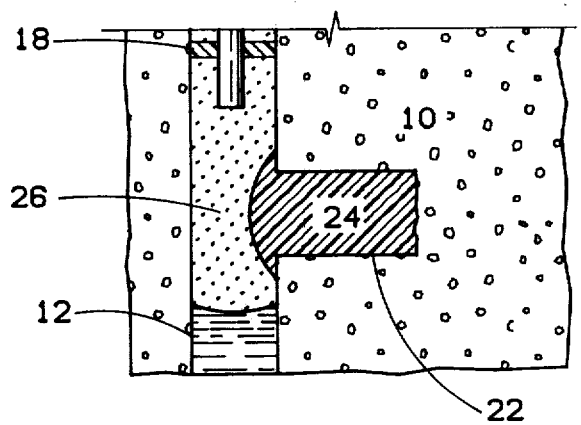
FIG. 2 is a view of the formation of FIG. 1 after a low leakoff, high efficiency fluid of the present invention has been injected in the fracture formed therein.
Figure 3:
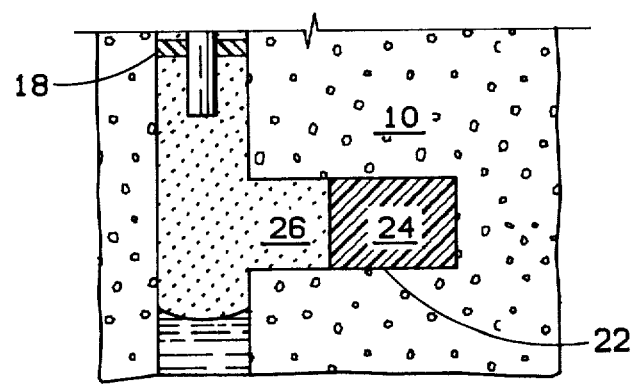
FIG. 3 is a view of the formation of FIG. 1 after a low leakoff, high efficiency followed by a first quantity of controlled viscosity fluid containing a propping agent has been injected in the formation formed therein.

Referring now to FIG. 2, after fracture 22 is formed in the formation, a quantity of low leakoff, high efficiency fluid 24 is pumped into the fracture 22 at a pressure equal to or greater than the pressure required to initially fracture the formation 10. As shown in FIG. 3, fluid 24 is followed in the fracture 22 by a first quantity of controlled viscosity fluid 26.

Figure 4:
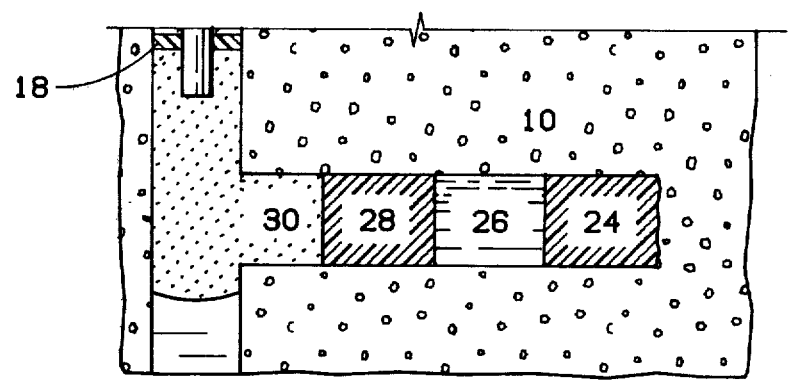
FIG. 4 is a view of the formation of FIG. 1 after a third quantity of controlled viscosity fluid of the present invention has been injected in the formation formed therein.

As shown in FIG. 3, the first quantity 26 of controlled viscosity fluid carrying an amount of propping agent is pumped into the fracture 22 behind low leakoff, wall building fluid 24 causing the low leakoff fluid 24 to widen and lengthen the fracture 22 further. A second quantity 28 of controlled viscosity fluid carrying proppant is pumped into the fracture 22 behind first quantity of controlled viscosity fluid 26 and low leakoff fluid 24, thereby causing still further fracture extension. Referring to FIG. 4, a third quantity 30 of controlled viscosity fluid carrying proppant is pumped into the fracture 22 behind first and second quantities 26 and 28 and low leakoff fluid 24. Successive quantities of controlled viscosity fluid carrying proppant are pumped into the fracture 22 behind the preceding quantities until the fracture 22 attains the desired width and length.

Each succeeding quantity of controlled viscosity fluid contains a greater concentration of propping agent. This allows the fracture to be wider and extended to the greatest extent without risking bridging of the proppant. Preferably, the first quantity 26 contains propping agent ranging from about 1 to 4#/gal of fluid; second quantity 28 contains from about 3 to 6#/gal; third quantity 30 contains from about 5 to 7#/gal; and successive quantities containing graduated amounts of proppant up to about 12#/gal of fluid.

While the high efficiency fluid leaks off into the fracture faces, a "wall" of fluid 24 is placed in the fracture improving the leakoff control of the sand ladened fluids 26, 28, and 30.

Figure 5:
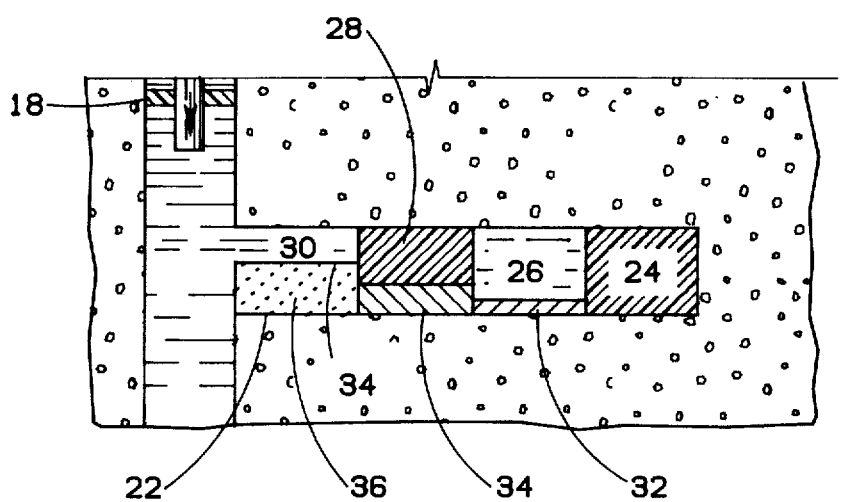
FIG. 5 is a view of the formation of FIG. 1 after the pressure exerted on the formation has been reduced.

As illustrated in FIG. 5, injection of the fracturing fluid is stopped and the well is shut-in. The pressure in the fracture is then reduced by deterioration of the fluid loss characteristics of the initial fluid so as to allow the proppant carrying fluid to migrate into formation 10 leaving proppants 32, 34, and 36 previously contained is respective controlled viscosity quantities 26, 28, and 30. During this step, the fracture 22 in the formation 10 will narrow or decrease due to the overburden pressure exerted on the formation 10 until it is held open solely by the propping agents.

As will be understood by those skilled in the art, the particular quantities of proppant carrying and low-leakoff fluids used will depend upon the type of formation being treated, the length of fracture desired in the formation, and the width and capacity of the fractures desired. The greater the length of desired fracture, the more graduated the concentration of proppant, the more low-leakoff fluid, and the finer the proppant. Particular types of proppant carrying fluid and low leakoff fluid and propping agent used will also depend on the type of fracture desired, etc.

The low leakoff, wall building fluid preferably is such that it allows very little fluid loss while the fracturing treatment is in progress and allows substantial fluid loss to the formation when the treatment is over.

A suitable low leakoff, high efficiency fluid comprises an oil in water emulsion which is made up of two phases: an internal oil phase and an external water phase. The oil phase should constitute from 50 to 60 volume % of the fluid. The water phase should contain sufficient amounts of a water soluble polymer to impart desired properties to the overall fluid. The concentration of the oil phase and the polymer should be controlled such that the emulsion has a viscosity of at least 100 centipoises at 70° F. and 10 centipoises at 260° F.

The water phase comprises an aqueous polymer solution having a viscosity of at least 10 centipoises, and preferably between about 10 and 100 centipoises, at 70° F. and a shear rate of 511 reciprocal seconds. The aqueous polymer solution can be prepared by adding water-soluble polymeric thickening agent to the water prior to mixing the water and oil phases together. From these phases, the low leakoff high efficiency fluid can be made by a continuous or batch mixing technique. The fracturing method is carried out by injecting the fluid under sufficient pressure and rate of pumping to open a fracture in the formation.

As indicated above, the external water phase of the fluid should have a minimum apparent viscosity of 10 centipoises at 70° F. and a shear rate of 511 reciprocal seconds. The viscous external phase also improves the stability of the fluid as the tendency of the dispersed oil particles to coalesce is substantially reduced.

In a typical treatment, the low leakoff, high efficiency fluid will be formulated from four basic ingredients: an aqueous liquid providing the external water phase, a hydrocarbon liquid providing the internal oil phase, an emulsifier for promoting and stabilizing the emulsion fluid, and a polymeric thickening agent for building viscosity of the water phase.

Choice of the aqueous and hydrocarbon liquids will generally be governed by the availability of the liquids involved. When employing anionic or cationic emulsifiers that are sensitive to the presence of divalent ions, soft water should generally be used. However, hard water including sea water or brine, if properly treated with water-softening chemicals such as trisodium phosphate or hexametaphosphate, can be employed. If available, water from a public water supply can be used with the sensitive emulsifiers. This water, however, should be tested for hardness and softened, if necessary. As a general rule, the nonionic emulsifying agents are not sensitive to the divalent ions and therefore can be used in hard water.

The hydrocarbon liquid can be a virgin crude oil or a refined petroleum fraction such as kerosene, gasoline, diesel oil, gas oil, or the like. Crude oil produced from the formation to be treated is preferred because of its availability and because of its compatibility with the formation. Fluids containing crude oil as the internal phase generally provide for rapid well cleanup following the treatment. If crude oil is not available, other hydrocarbon oils can be used. These oils preferably should have a viscosity not greater than are of formation oil. Hydrocarbon liquids having a viscosity less than about 10 centipoise at formation temperature are preferred for most applications due to low pumping costs. Gas condensate, if available, can also be used and offers the advantage of promoting even more rapid well clean-up. Condensate is a light volatile liquid with an API gravity greater than about 50.

The selection of the most efficient emulsifier and its concentration in the water phase will depend on several factors, including the composition of the oil and water to be emulsified, the temperature of the formation to be treated, the type of blending equipment available, and the composition of the additives to be employed in the emulsion. The most efficient emulsifier or blend of emulsifiers for a particular system may require a selection by processes known to those skilled in the art of forming emulsion.

As indicated earlier, the emulsifier may be an anionic, cationic, or nonionic surfactant. Suitable anionic emulsifiers for many emulsions of the invention include, but are not limited to the alkali, amine, and other carboxylic acid soaps.

The cationic emulsifying agents of principal importance are amines and quaternary ammonium salts such as polyoxyethylene sorbitol oleate-polyoxyethylene amine blend, polyoxyethylene alkyl amine, and quaternary ammonium derivatives.

The nonionic emulsifying agents are generally independent of water hardness and pH and are therefore compatible with hard water. A few of the general purpose nonionic emulsifiers capable of promoting stable oil-in-water emulsions include polyoxyethylene sorbitan monolaurate, polyoxyethylene lauryl ether, polyoxyethylene sorbitan esters of mixed fatty and resin acids, polyoxyethylene glycol monopalmitate, and polyoxyethylene sorbitan monopalmitate.

The concentration of the emulsifying agent in the water will depend upon a multitude of factors. The optimum concentration for a particular system will generally be determined by methods known to those skilled in the art of forming emulsions. Concentrations between about 0.1 weight percent and about 3.0 weight percent of the emulsifying agent based on the weight of the aqueous phase should be satisfactory for most applications.

As mentioned previously, many of the polymeric thickening agents which possess surface active properties can be used as the emulsifier to promote the oil-in-water emulsion. The carboxyvinyl polymers are representative of this group. Polyvinylcarboxylic acid neutralized with a long-chain amine and a common base such as sodium hydroxide is capable of promoting extremely stable oil-in-water emulsions. The emulsified system exhibits excellent temperature resistance and therefore can be used in deep, high-temperature wells.

The polymeric thickening agent can be any one of a variety of long-chain, water-soluble polymers capable of building the viscosity of an aqueous solution. These polymers are commonly referred to as gums. Synthetic and modified polymers and natural gums can be used. The synthetic and modified polymers include but are not limited to the acrylic polymers such as polyacrylamide and polyacrylic acid; the vinyl polymers such as polyvinylpyrrolidone and polyvinylcarboxylic acid neutralized with a long-chain amine and a common base; and the cellulose derivatives such as carboxymethylcellulose sodium carboxymethylcellulose, sodium carboxymethylhydroxyethylcellulose, methylcellulose, hydroxethylcellulose, and ethylhydroxyethylcellulose.

Natural gums include but are not limited to guar gum, gum arabic, gum tragacanth, gum karaya, and the like. Also unable are the microbial fermentation gums such as dextran and the heteropolysaccharides produced by the bacteria of the genus Xanthomonas.

The concentration of the polymeric thickening agent in the water phase will depend upon the effectiveness of the material used and the apparent viscosity desired. Experience has shown, however, that a polymer concentration between about 0.1 and 1.0 weight percent based on the weight of the water phase is sufficient for most applications.

Additional additives that may be employed in the fracturing fluid include slow-acting demulsifying agents for breaking the emulsion and chemicals for degrading the polymeric thickening agent. These materials may be required in certain systems to transform the viscous emulsion to a demulsified, low viscosity state for promoting well clean-up. In some systems, it may prove satisfactory to merely degrade the polymer. The emulsion without the polymer may have sufficient mobility to permit rapid well clean-up. If the formation to be treated contains water-sensitive clays, salt such as potassium chloride can also be added to the fluid.

The controlled viscosity fluid should have viscosity greater than about 50 centipoise and less than about 400 centipoise. Preferably, the viscosity will range from about 150 to about 300 centipoise. More preferably, the viscosity of the controlled viscosity fluid is about 200 centipoise.

Examples of controlled viscosity fluids which may be employed in the present inventions include but are not limited to water gels, hydrocarbon gels, hydrocarbon in water, water in hydrocarbon emulsions, and water or oil foams. Suitably, water gels may be formed by combining water with natural gums, carboxyethyl cellulose, carboxymethyl hydroxyethyl cellulose, polyacrylamide, and starches. Chemical complex of the above compounds formed through chemical crosslinking are employed by the present invention. Such complexes may be formed with various metal complexers such as borate, copper, nickel, and zirconium. Other chemical complexes of the above materials may be used which are formed by organic complexers such as hexamethyl methyloxy methylmellanine.

Examples of hydrocarbon gels which may be employed in the present invention are those gels which are formed when a hydrocarbon liquid such as kerosene is combined with metallic soaps, polyisobutylene polyalkylstyrene, isobutyl acrylate, isobutyl methylacrylate and aluminum soaps.

A high viscosity fluid containing an organic compound selected from the class consisting of guar gum and locust bean gum, sufficient boron compound capable of supplying enough borate ions to react with the organic compound and capable of maintaining free borate ions in the fluid, sufficient alkaline material to raise the pH of the fluid above 8.0, and sufficient organic compound and borate compound in the fluid to produce a fluid viscosity of 200 centipoise or capable of supporting up to 12 pounds of proppant per gallon of fluid is preferred.

The high viscosity fluid may contain from one to 12 pounds of proppant per gallon of fluid.

As will be understood by those skilled in the art, many other high viscosity fluid types of materials may be employed in the present invention. These materials may behave as either plastic fluids or pseudo-plastic fluids. Plastic fluids flow upon application of stress which exceeds a stress threshold. Pseudo-plastic fluids, although having no defined yield point, will yield high apparent viscosities at low shear rates in laminar flow. A pseudo-plastic fluid having thixotropic properties is particularly useful for the use in the present invention. Thixotropic may be defined as the property or phenomenon exhibited by some gels, whereby the gels become fluid when stressed and the change is reversible. The apparent viscosity of this type of fluid depends not only on the rate of shear but also on the time over which shear has been applied. Since thixotropy is a reversible process, a highly viscous gel structure is obtained when the fluid is moved and agitated.

The present invention, therefore, is well adapted to attain the advantages mentioned, as well as those inherent therein. While presently preferred embodiments of the invention are given for the purpose of the disclosure, numerous changes can be made which will readily suggest themselves to those skilled in the art and which encompass within the spirit of the invention disclosed herein.

EXAMPLE 1

A low leakoff, high efficient fluid containing no proppants made up of a polyemulsion fracturing fluid consisting of two-thirds by volume of hydrocarbon phase emulsified with one-third by volume gelled water (gelled with guar gum) was subjected to a laboratory fluid loss coefficient test, Super Sandfrac K-1 (Dowell Division, Dow Chemical Co.), as described in API recommended practice No. 39. The average fluid loss coefficient results are shown in Table 1.

EXAMPLE 2

A controlled viscosity fluid made up of a cross-linked chemically modified guar gum derivative, Versagel (Halliburton Co.) was subjected to the laboratory tests of Example 1 and the average fluid loss coefficient results are present in Table 1.

EXAMPLE 3

A wall of the polyemulsion fluid of Example 1 was built followed by the cross-linked gel of Example 2 was subjected to the laboratory fluid loss test of Example 1. The average fluid loss coefficient is presented in Table 1.

TABLE 1

|  | Fluid Loss Coefficient $ft^3/min\text{-}ft^2$ |
|---|---|
| Polyemulsion | 0.00029 |
| Cross-linked polymer gel | 0.00276 |
| Polyemulsion/polymer gel | 0.00078 |

The leak-off control of the polyemulsion/polymer gel is shown to be in the same order of magnitude as the polyemulsion with the added advantage of excellent sand transport capabilities.

Various embodiments and modifications of this invention have been described in the foregoing specification, and further modifications will be apparent to those skilled in the art. Such modifications are included within the scope of this invention as defined by the following claims:

I claim:

1. The method of extending a fracture in a subterranean formation, comprising injecting into a fracture in the formation through a wellbore an oil-in-water emulsion fluid at a sufficient pressure and rate to extend the fracture in said formation, followed by injecting into the fracture a cross-linked polymer gel containing a quantity of propping agents therein at a sufficient pressure and rate to extend the fracture into the formation so that said fracture is lengthened and the propping agent is carried into said formation, and shutting in the wellbore.

2. The method of claim 1 wherein a first quantity of crosslinked polymer gel contains between about 1 lb/gal to 4 lb/gal of proppant and subsequent quantities contain at least about 3 lb/gal of proppant.

3. The method of claim 1 wherein a first quantity of polymer gel contains about 1 lb/gal to 4 lb/gal of proppant, the second quantity contains from about 3 to 6 lb/gal, the third quantity contains from about 5 to 7 lb/gal, and successive quantities contain graded amounts of proppant up to about 12 lb/gal.

4. The method of claim 1 wherein the crosslinked polymer gel has a viscosity of from between about 50–400 cp.

* * * * *